(12) United States Patent
Matula et al.

(10) Patent No.: US 11,352,749 B2
(45) Date of Patent: Jun. 7, 2022

(54) METHOD OF AND AN ARRANGEMENT FOR ADDING A CHEMICAL TO AN APPROACH FLOW SYSTEM OF A FIBER WEB MACHINE

(71) Applicants: WETEND TECHNOLOGIES OY, Savonlinna (FI); VALMET TECHNOLOGIES OY, Espoo (FI)

(72) Inventors: Jouni Matula, Savonlinna (FI); Jari Mäkinen, Jämsä (FI); Jussi Matula, Savonlinna (FI)

(73) Assignees: WETEND TECHNOLOGY OY, Savonlinna (FI); VALMET TECHNOLOGIES OY, Espoo (FI)

( * ) Notice: Subject to any disclaimer, the term of this patent is extended or adjusted under 35 U.S.C. 154(b) by 92 days.

(21) Appl. No.: 16/914,799

(22) Filed: Jun. 29, 2020

(65) Prior Publication Data

US 2020/0407913 A1    Dec. 31, 2020

(30) Foreign Application Priority Data

Jun. 28, 2019  (EP) ..................................... 19183236

(51) Int. Cl.
| | | |
|---|---|---|
| *D21F 1/02* | (2006.01) | |
| *B01F 5/04* | (2006.01) | |
| *D21B 1/34* | (2006.01) | |
| *D21H 21/10* | (2006.01) | |

(52) U.S. Cl.
CPC ............. *D21F 1/02* (2013.01); *B01F 5/0403* (2013.01); *D21B 1/342* (2013.01); *D21H 21/10* (2013.01)

(58) Field of Classification Search
USPC .......................................................... 162/158
See application file for complete search history.

(56) References Cited

U.S. PATENT DOCUMENTS

| | | | |
|---|---|---|---|
| 3,933,966 A  * | 1/1976 | Waris .................... | D21F 1/02 |
| | | | 162/183 |
| 6,659,636 B1 * | 12/2003 | Matula ................... | D21H 23/20 |
| | | | 366/165.1 |
| 8,602,634 B2 | 12/2013 | Matula | |
| 8,747,619 B2 | 6/2014 | Kukkamaki | |
| 8,852,402 B2 | 10/2014 | Imppola et al. | |
| 9,453,305 B2 | 9/2016 | Imppola et al. | |
| 9,616,399 B2 | 4/2017 | Matula | |
| 9,649,607 B2 | 5/2017 | Matula et al. | |
| 9,708,772 B2 | 7/2017 | Heiskanen et al. | |
| 9,752,280 B2 | 9/2017 | Matula | |

(Continued)

FOREIGN PATENT DOCUMENTS

| | | |
|---|---|---|
| EP | 1 219 344 | 7/2002 |
| WO | 99/36613 | 7/1999 |

(Continued)

OTHER PUBLICATIONS

Extended European Search Report for EP19183236.9 dated Dec. 13, 2019, 5 pages.

*Primary Examiner* — Mark Halpern
(74) *Attorney, Agent, or Firm* — Nixon & Vanderhye P.C.

(57) ABSTRACT

A method of and an arrangement for adding a chemical to an approach flow system of a fiber web machine by mixing of a retention chemical to a fibrous stock flowing in an approach flow system of a fiber web machine by a mixer (200) between the attenuator (16) and the headbox (18).

17 Claims, 2 Drawing Sheets

(56) References Cited

U.S. PATENT DOCUMENTS

| | | | |
|---|---|---|---|
| 9,863,093 B2 | 1/2018 | Imppola et al. | |
| 2002/0131325 A1* | 9/2002 | Matula | B01F 5/0057 |
| | | | 366/165.1 |
| 2004/0060678 A1* | 4/2004 | Eriksson | D21G 9/0027 |
| | | | 162/198 |
| 2005/0224204 A1* | 10/2005 | Hietaniemi | D21F 1/08 |
| | | | 162/198 |
| 2005/0279477 A1* | 12/2005 | Hietaniemi | D21F 1/08 |
| | | | 162/198 |
| 2008/0230194 A1* | 9/2008 | Matula | B01F 5/045 |
| | | | 162/166 |
| 2014/0369156 A1 | 12/2014 | Holmstrand et al. | |
| 2015/0029215 A1 | 10/2015 | Imppola et al. | |
| 2016/0060813 A1* | 3/2016 | Heiskanen | C01F 11/181 |
| | | | 162/168.3 |

FOREIGN PATENT DOCUMENTS

| | | |
|---|---|---|
| WO | 99/64666 | 12/1999 |
| WO | 02/46525 | 6/2002 |
| WO | 02/072250 | 9/2002 |
| WO | 02/072948 | 9/2002 |

* cited by examiner

METHOD OF AND AN ARRANGEMENT FOR ADDING A CHEMICAL TO AN APPROACH FLOW SYSTEM OF A FIBER WEB MACHINE

RELATED APPLICATION

This application claims priority to European patent application 19183236.9, filed Jun. 28, 2019, the entirety of which is incorporated by reference.

TECHNICAL FIELD

The present invention relates to a method of and an arrangement for adding a chemical to an approach flow system of a fiber web machine. More specifically the present invention concerns mixing of a retention chemical to a fibrous stock flowing in the approach flow system of a fiber web machine.

BACKGROUND ART

A paper machine or, in broader terms, a fiber web machine is preceded by an approach flow system in which the fibrous suspension, normally called stock, used for making a fibrous web at the fiber web machine is prepared. At the approach flow system various stock components, e.g., virgin and/or recycled pulp and/or broke are mixed together with white water recovered from the fiber web machine, fillers and other desired additives are mixed with the stock and the stock or one or more of its components are, if considered necessary, deaerated. Further, at the approach flow system the stock is introduced by means of a headbox feed pump, normally a specifically designed centrifugal pump, to a headbox screen where the stock is finalized for the web production. The approach flow system is also provided with a mixer or mixers for adding retention chemical/s, as well as possibly other chemicals, to the stock.

Retention chemicals have been used for a long time in paper making for retaining fine solids like for instance fillers and other additives used in the production of paper, in the fibrous web while water, so called white water, is drained from the fibrous web at the forming and drying sections of the fiber web machine. The retention chemicals bind the solids to one another and to fibers of the stock soon after they are introduced into the mixture of fibers and the solids. The introduction of retention chemical/s may take place before or after the headbox screen. However, usually the introduction is performed in such a stage that the agglomerations formed by the retention chemical/s are formed only after the headbox screen, as, on the one hand, the screen could easily sort out such agglomerations from the stock the web is later on made, or, on the other hand, the screen by creating turbulence could break the agglomerations and thereby reduce the retention of solids in the web. Therefore, quite often the retention chemical/s are added to the outlet duct of the headbox screen where there is such weak turbulence left that is not capable of breaking the agglomerations to be formed but is still capable of aiding in the mixing of the retention chemical/s. The mixing of retention chemical/s may be performed by static mixers, like discussed in WO-A1-9964666 and WO-A1-02072250, or rotary mixers, like discussed in US-A1-2014369156, or injection mixers. During the past two decades an injection-type chemical mixer, TrumpJet®, has gained wide acceptance in the field of mixing retention and other chemicals to fibrous suspensions. The above mentioned TrumpJet®-mixer and its use are discussed in, for instance, EP-B1-1219344. The TrumpJet®-mixer is used either as a single mixing unit or as a mixing station formed of a number of mixers or mixing units arranged on the circumference of the flow pipe in which the medium to which the chemical is supposed to be mixed flows.

Production of sheet-like products from fibrous suspensions by means of a fiber web machine requires that the flow of fibrous suspension, i.e. so-called stock, to the headbox of the fiber web machine and from the headbox to the wire of the fiber web machine is as free of any kind of pulsations as possible. The higher is the required quality of the end product the less pulsations are allowed.

Most of the pulses detectable in the flow of the fibrous suspensions originate from the headbox feed pump and the headbox screen. The headbox screen is positioned between the headbox feed pump and the headbox to finalize the quality of the fibrous suspension. The pulsation tendency of the feed pump and the headbox screen are minimized by carefully designing both to create as few and as small-scale pulses as possible. However, the pulses cannot be removed entirely, whereby other actions are taken to treat the pulp after the headbox screen.

In the production of high-quality products the headbox of the fiber web machine, most often in this case a paper machine, may be provided with an apparatus for damping pulp stock pressure fluctuations, like for instance discussed in U.S. Pat. No. 4,166,759. The document discusses a headbox of a paper machine including a header chamber for receiving pulp stock, a distribution pipe system for receiving pulp stock from the header chamber, a flow-equalizing chamber for receiving pulp stock from the distribution pipe system, a turbulence passage system for receiving pulp stock from the flow-equalizing chamber, and a lip slice for receiving pulp stock from the turbulence passage system and discharging the pulp stock from the headbox. At least one of the above chambers is defined in part by a movable wall structure which has an inner surface contacting the pulp stock so that this movable wall structure can move in response to pressure fluctuations in the pulp stock. This wall structure has an outer surface which defines part of the hollow interior of an enclosure in which air under pressure is situated, so that through the movable wall structure the air under pressure can act on the pulp stock to damp pressure fluctuations thereof.

However, as the above discussed apparatus built in connection with the headbox is quite a complicated one and thus requires a considerable investment, other means for fighting pulsations and pressure fluctuations are considered, designed and finally taken into use.

One of such means is a so called attenuator or attenuator tank that is located downstream of the headbox screen and upstream of the headbox. The purpose of the attenuator is to dampen the pulsations in the fiber suspension flow, i.e. stock after the headbox screen. The construction and operation of the attenuator is discussed in more detail in connection with FIG. 2.

This far the mixers for adding retention chemical/s to the fiber suspension were positioned upstream of the attenuator in close communication with the outlet duct of the headbox screen, as was discussed already earlier. Sometimes the mixer/s were provided even upstream of the headbox screen, if the retention chemical was a slowly reacting one and the agglomerations were, thus, formed only after the headbox screen. However, it was commonly understood that the fiber suspension flows gently via the attenuator to the headbox. The attenuator was only supposed to dampen the pulsations.

For instance, the TrumpJet® injection mixers were always arranged in the outlet duct of the headbox screen as it was known that there is some turbulence left in the outlet pipe, and such a turbulence always helps in mixing the chemical/s in the stock. Thus, whenever the approach flow system had both a chemical mixer and an attenuator the retention chemical mixer was positioned upstream of the attenuator, most usually between the headbox screen and the attenuator.

When considering the retention of solids, so-called fines, in a number of fiber web machines or paper making machines in which TrumpJet® chemical mixers were used for feeding the retention chemical into the fibrous stock after the headbox screen, it was surprisingly realized that in cases where there was no attenuator at all in the approach flow system the retention of fine solids was considerably better than in cases where the TrumpJet® chemical mixers were followed by an attenuator. In other words, it looked like the attenuator had somehow a negative effect on the retention of fine solids.

BRIEF SUMMARY

The above assumption gave a reason to study the positioning of the TrumpJet® chemical mixers in relation to the attenuator. When the TrumpJet® chemical mixers were positioned between the attenuator and the headbox, it was learned that the same level of retention could be achieved by a significantly reduced retention chemical consumption. As the retention, i.e. the share of fine solids retained in the fibrous web compared to the total amount of fine solids present in the stock when introduced on the wire, depends on the strength of bonds formed by the retention chemical, i.e. on the type and quality of the retention chemical/s used, the reduction in chemical consumption varied between 10 and 40% depending on the type of the retention chemical.

Embodiments of the invention disclosed herein may be configured to solve at least one of the above discussed problems; to reduce the costs involved in the production of a web-like article; to improve the retention of fine solids in relation to the used amount of retention chemical(s) and/or to reduce the use of retention chemical/s in relation to the achieved retention.

The invention may be embodied as a method of adding a retention chemical to an approach flow system of a fiber web machine, the method includes introducing fibrous stock by a headbox feed pump via an attenuator to a headbox of the fiber web machine, and adding the retention chemical to the fibrous stock between the attenuator and the headbox.

The invention may include an arrangement for adding a retention chemical to an approach flow system of a fiber web machine, the arrangement comprising an approach flow system having an attenuator, a headbox and a chemical mixer such that the chemical mixer is arranged downstream of the attenuator between the attenuator and the headbox.

BRIEF DESCRIPTION OF DRAWINGS

In the following the prior art and the present invention are discussed in more detail with reference to the accompanying drawings, in which.

DETAILED DESCRIPTION OF DRAWINGS

Figure 1:
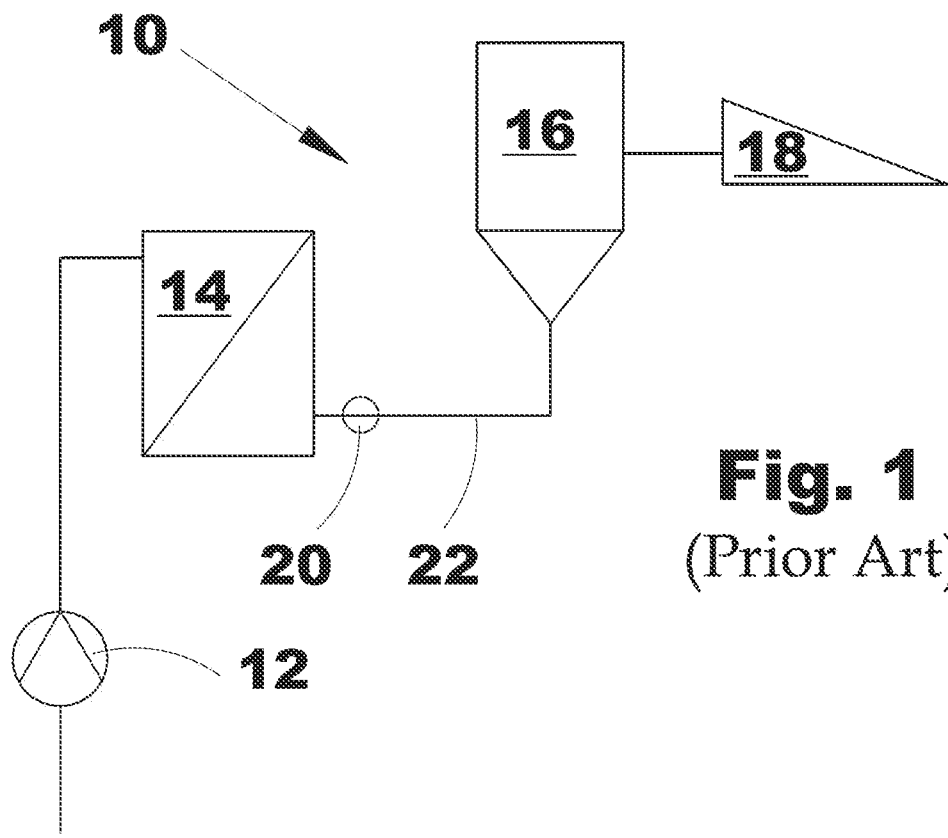
FIG. 1 illustrates a partial view of a prior art approach flow system of a fiber web machine.

FIG. 1 illustrates a partial view of a prior art approach flow system of a fiber web machine. In accordance with FIG. 1, the approach flow system 10 of the fiber web machine comprises, in addition to the not-shown components, a headbox feed pump 12, a headbox screen 14, an attenuator 16 and a headbox 18 via which the fibrous stock is delivered to the forming section of the fiber web machine, normally on the wire or forming section thereof. Further, the approach flow system 10 comprises a retention chemical mixer 20, preferably, but not necessarily, a TrumpJet® chemical mixer or a set of TrumpJet® chemical mixers, e.g. a TrumpJet® mixing station, depending on the diameter of outlet duct of the headbox screen or that of the flow pipe 22 leading from the headbox screen 14 to the attenuator 16. The chemical mixer 20 is positioned upstream of the attenuator 16, possibly in the outlet duct of the headbox screen 14.

Figure 2:
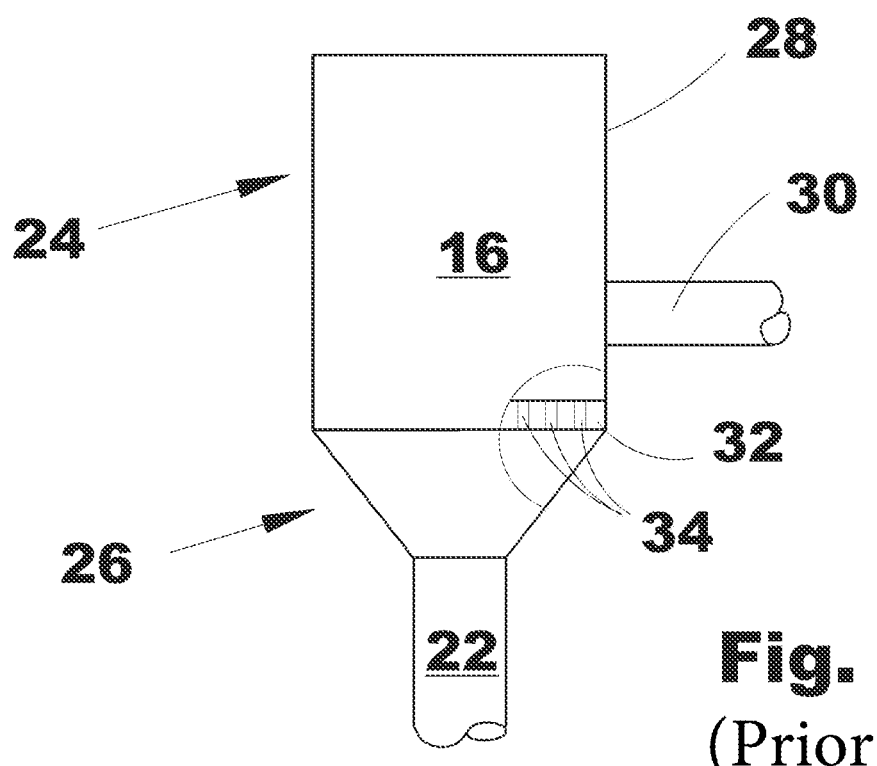
FIG. 2 illustrates a partially cut side view of an attenuator of prior art.

FIG. 2 illustrates a partially cut side view of a prior art attenuator 16. The attenuator 16 is normally formed of a cylindrical upright section 24 to which fibrous stock is introduced from below via a conically enlarging pipe section 26 from the flow pipe 22 provided between the headbox screen and the attenuator 16. In a first optional attenuator construction the cylindrical wall 28 of the cylindrical upright section 24 is provided with a connection 30 for a single headbox feed pipe. In a second optional construction the wall of the cylindrical upright section is provided with dozens of radial outlets, which are connected to a number of feed hoses delivering fibrous stock to the headbox. In both constructions at the lower end of the cylindrical upright section 24 there is arranged a horizontal plate 32, which is provided with vertical openings 34. The horizontal plate, in a way, forms the bottom of the cylindrical section. In some attenuators (for example Kadant Octopus™ system) the openings are formed of two sections, a small-diameter inlet or lower section, and a large diameter outlet or upper section. The desired function of the numerous openings 34 is to dampen the pressure fluctuations and other pulsations such that the flow of the fibrous stock upstream of the horizontal plate and also in the attenuator outlet/s from the attenuator to the headbox is pulse-free.

Figure 3:
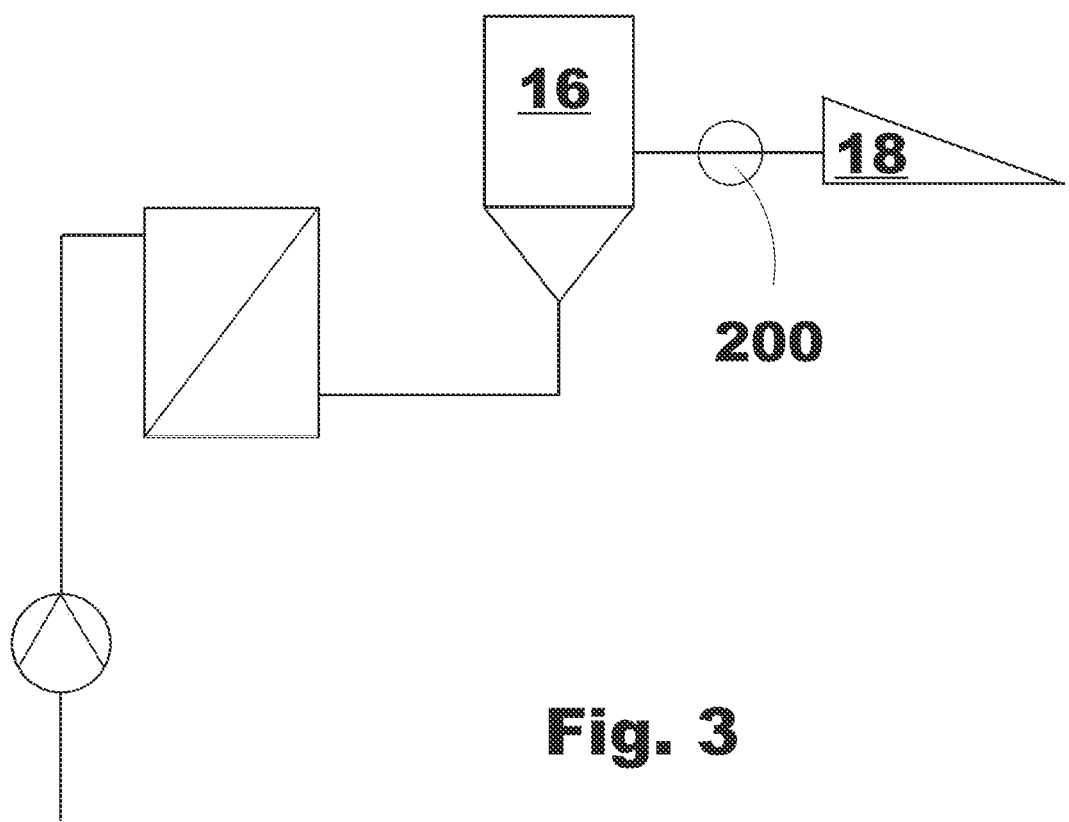
FIG. 3 illustrates a partial view of an approach flow system of a fiber web machine in accordance with a preferred embodiment of the present invention.

However, when the function of the openings 34 were studied in more detail it was learned that while the fibrous stock is forced through the openings 34 such relatively strong shear forces are created in the stock that break bonds between the retention chemical and the fine solids. Such breaking of bonds is seen as reduced retention at the paper or fiber web machine. When the TrumpJet® chemical mixer 200 or the set of TrumpJet® chemical mixers, i.e. the mixing station was tested downstream of the attenuator 16, as shown in FIG. 3, it was learned that the retention of fine solids was far better than when the TrumpJet® chemical mixer/s were located upstream of the attenuator 16. It was learned that the same level of retention at the fiber web machine was reached by using 10% to 40% less retention chemical when the mixing arrangement of the present invention was used. This finding, naturally, means that, compared to the prior art arrangement, the retention may be simultaneously improved and the use of retention chemical decreased, within certain limits, with the arrangement of the present invention.

The chemical mixer 200 may be an injection mixer or a set of injection mixers. The injection mixer injects the chemical to the stock by using an injection liquid for forcing a relatively small amount of chemical to penetrate deep into the stock flow. The injection liquid is, preferably but not necessarily, the same stock to which the chemical is to be mixed. Such an injection liquid is, preferably but not necessarily, taken upstream of the mixer to be injected by means of the mixer together with the chemical to the stock flow. Other options for the injection liquid are fresh pulp, recycled pulp, white water, fresh water, etc. just to name a few options without any intention of limiting the applicable liquids to the listed alternatives only.

It should also be understood that the present invention covers mixing either a single retention chemical or two or more retention chemicals to the stock downstream of the attenuator. In other words, it is possible that in cases where more than one retention chemical is used (in addition to the one mixed downstream of the attenuator), one retention chemical is mixed to the stock between the headbox screen and the attenuator and/or one retention chemical is mixed to the stock upstream of the headbox screen. Naturally, it is preferable in these two latter alternatives that the retention chemical is such a slowly reacting one that it forms agglomerations only after the attenuator.

Further, it should be understood that the mixing of retention chemical/s may be performed with any such mixer that is capable of forming an even division of retention chemical in the stock. In other words, the mixers may be static ones, rotary ones or injecting ones.

And finally, it should also be understood that other wet end chemical/s and/or additives may be mixed with the stock together with retention chemical/s, Such chemicals or additives are, for instance, sizing agents like alkenyl succinic anhydride (ASA) or alkyl ketene dimer (AKD), starch, filler, paper dye or pigment, micro or nanofibre (MFC, NFC) and other synthetic fibres, just to name a few options. Such chemicals or additives may be either premixed with the retention chemical/s prior to mixing with the stock or just introduced and mixed together with the retention chemical/s with the stock.

Although the invention has been described with reference to specific illustrated embodiments, it is emphasized that it also covers equivalents to the disclosed features, as well as changes and variants obvious to a man skilled in the art, and the scope of the invention is only limited by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method of adding a retention chemical to an approach flow system of a fiber web machine, the method comprising:
introducing a fibrous stock by a headbox feed pump via an attenuator to a headbox of a fiber web machine, and
adding the retention chemical to the fibrous stock between the attenuator and the headbox.

2. The method as recited in claim 1, further comprising providing a headbox screen between the headbox feed pump and the attenuator.

3. The method as recited in claim 1, further comprising using at least one injection mixer in the step of adding the retention chemical.

4. The method as recited in claim 3, further comprising using an injection liquid to cause the retention chemical to penetrate the fibrous stock.

5. The method as recited in claim 4, further comprising taking at least some of the fibrous stock from upstream of the at least one injection mixer and using the at least some of the fibrous stock as an injection liquid to feed the retention chemical to the fibrous stock.

6. The method as recited in claim 1, further comprising using a static, a rotary or an injection mixer to perform the step of adding the retention chemical to the fibrous stock.

7. The method as recited in claim 1, further comprising mixing the fibrous stock together with the retention chemical and other chemicals and/or additives.

8. The method as recited in claim 7, wherein the other chemicals and/or additives include at least one of: a sizing agent, alkenyl succinic anhydride (ASA), alkyl ketene dimer (AKD), starch, filler, paper dye, paper pigment, microfiber, a nanofiber, and another synthetic fibre.

9. The method as recited in claim 7, further comprising premixing the other chemicals and/or additives with the retention chemical prior to mixing the retention chemical with the fibrous stock.

10. A method comprising:
introducing a fibrous stock by a headbox feed pump via an attenuator to a headbox of a fiber web machine, and
adding a retention chemical to the fibrous stock between the attenuator and the headbox.

11. The method of claim 10, further comprising providing a headbox screen between the headbox feed pump and the attenuator.

12. The method of claim 10, wherein the adding of the retention chemical is performed with an injection mixer injecting the retention chemical to the fibrous stock.

13. The method of claim 12, further comprising using the injection liquid to penetrate the retention chemical into the fibrous stock.

14. The method of claim 12, further comprising diverting at least some of the fibrous stock from upstream of the injection mixer and feeding the diverted fibrous stock as an injection liquid for feeding the retention chemical to the fibrous stock.

15. An arrangement for adding a retention chemical to an approach flow system of a fiber web machine, the approach flow system comprising an attenuator, a headbox and a chemical mixer, wherein the chemical mixer is arranged downstream of the attenuator and between the attenuator and the headbox.

16. The arrangement as recited in claim 15, further comprising a headbox fee pump and a headbox screen between the headbox feed pump and the attenuator.

17. The arrangement as recited in claim 15, wherein the chemical mixer is a static mixer, a rotary mixer or an injection mixer.

* * * * *